(12) United States Patent
Kuang et al.

(10) Patent No.: US 8,367,575 B2
(45) Date of Patent: Feb. 5, 2013

(54) HIGH-REFRACTIVITY LOW-DISPERSION OPTICAL GLASS

(75) Inventors: Bo Kuang, Sichuan (CN); Wei Wen, Sichuan (CN); Weimin Li, Sichuan (CN)

(73) Assignee: CDGM Glass Co., Ltd., Chengdu (CN)

( * ) Notice: Subject to any disclaimer, the term of this patent is extended or adjusted under 35 U.S.C. 154(b) by 73 days.

(21) Appl. No.: 13/123,512

(22) PCT Filed: Jul. 15, 2009

(86) PCT No.: PCT/CN2009/072771
§ 371 (c)(1),
(2), (4) Date: Apr. 8, 2011

(87) PCT Pub. No.: WO2010/043127
PCT Pub. Date: Apr. 22, 2010

(65) Prior Publication Data
US 2011/0195833 A1    Aug. 11, 2011

(30) Foreign Application Priority Data
Oct. 16, 2008  (CN) .......................... 2008 1 0304963

(51) Int. Cl.
*C03C 3/068* (2006.01)
(52) U.S. Cl. ............................................. 501/78; 501/79
(58) Field of Classification Search .................. 501/78, 501/79
See application file for complete search history.

(56) References Cited

U.S. PATENT DOCUMENTS

| 6,818,578 | B2 | | 11/2004 | Tachiwama | |
| 7,138,349 | B2 | * | 11/2006 | Uehara et al. | 501/78 |
| 7,335,614 | B2 | * | 2/2008 | Uehara et al. | 501/78 |
| 7,560,405 | B2 | | 7/2009 | Hayashi et al. | |
| 7,659,222 | B2 | * | 2/2010 | Shimizu | 501/78 |
| 8,163,665 | B2 | * | 4/2012 | Uehara et al. | 501/78 |
| 2006/0229186 | A1 | * | 10/2006 | Uehara et al. | 501/78 |
| 2008/0220961 | A1 | * | 9/2008 | Uehara et al. | 501/78 |

FOREIGN PATENT DOCUMENTS

| CN | 1326904 A | | 12/2001 |
| CN | 1445188 A | | 10/2003 |
| CN | 1935717 A | | 3/2007 |
| JP | 2002012443 A | | 1/2002 |
| JP | 2006016295 | * | 1/2006 |

OTHER PUBLICATIONS

International Search Report for PCT/CN2009/072771, Oct. 22, 2009.

\* cited by examiner

*Primary Examiner* — Karl Group
(74) *Attorney, Agent, or Firm* — Caesar, Rivise, Bernstein, Cohen & Pokotilow, Ltd.

(57) ABSTRACT

The invention provides an environment-friendly optical glass with high refractive index, low dispersion and high light transmittance. The optical glass includes 6%-17% of $B_2O_3$, 2-10% of $SiO_2$, more than 25% but less than 45% of $La_2O_3$, 5-25% of $Gd_2O_3$, 0-3% of $Nb_2O_5$, more than 19% but less than 27% of $Ta_2O_5$, 0-16% of $ZnO$, 0-5% of $BaO$, 0-5% of $CaO$, 0-5% of $SrO$, 0-9% of $ZrO_2$, 0-8% of $Y_2O_3$, 0-8% of $Yb_2O_3$, 0-5% of $WO_3$, 0-2% of $Li_2O$, $Na_2O$ and $K_2O$, equal to 0.01% but less than 0.1% of $Sb_2O_3$ and 0-1% of $SnO_2$ optical glass. The environment-friendly optical glass does not contain $GeO_2$, and has refractive index of 1.85-1.90, Abbe number of 35-45, the corresponding wavelength below 440 nm when transmittance thereof reaches 80% and high transmittance.

21 Claims, No Drawings

HIGH-REFRACTIVITY LOW-DISPERSION OPTICAL GLASS

FIELD OF THE INVENTION

The invention relates to an optical glass, more particularly, to an optical glass which has a refractive index (nd) of 1.85-1.90 and an Abbe number (vd) of 35-45.

DESCRIPTION OF THE RELATED ART

High refraction and low dispersion optical glass is widely applied to novel photovoltaic products for improving imaging quality of such products. To solve the problem of easy devitrification of the high refraction and low dispersion optical glass in smelting and production, germanium oxide was usually added to a formula. For example, Japanese Kokai No. 2006-151758A discloses a high refraction and low dispersion optical glass of $GeO_2$—$B_2O_3$—$La_2O_3$—$ZnO$—$Bi_2O_3$ system, but $GeO_2$ content thereof is up to 13% or even 17% (mass percentage; the same below), and the optical glass has higher cost due to high cost of the germanium oxide.

As transmittance of the optical glass is largely affected by the refractive index, the higher the refractive index is, the lower the transmittance is. For example, Japanese Kokai No. 2006-225220A discloses a high refraction and low dispersion optical glass, the corresponding wavelength (λ80) thereof is at least above 460 nm when the transmittance thereof reaches 80%.

With deterioration of the human living environment and continuous improvement of the environmental protection awareness, many countries give more and more strict requirements for use of hazardous chemical substances. $Sb_2O_3$ is usually used as a clarifier in the optical glass and content thereof is usually between 0.1% and 1%. As $Sb_2O_3$ is a heavy metal, the mass percentage of $Sb_2O_3$ in the optical glass shall not exceed 0.1% according to the new environmental protection requirements.

SUMMARY OF THE INVENTION

A technical problem to be solved by the invention is to provide an environment-friendly and cheap optical glass with a high refractive index, low dispersion and high transmittance.

A technical solution for solving the technical problem in the invention is to provide a high refraction and low dispersion optical glass which is characterized by consisting of 6%-17% of $B_2O_3$, 2-10% of $SiO_2$, more than 25% but less than 45% of $La_2O_3$, 5-25% of $Gd_2O_3$, 0-3% of $Nb_2O_5$, more than 19% but less than 27% of $Ta_2O_5$, 0-16% of ZnO, 0-5% of BaO, 0-5% of CaO, 0-5% of SrO, 0-9% of $ZrO_2$, 0-8% of $Y_2O_3$, 0-8% of $Yb_2O_3$, 0-5% of $WO_3$, 0-2% of $Li_2O$, $Na_2O$ and $K_2O$, equal to 0.01% but less than 0.1% of $Sb_2O_3$ and 0-1% of $SnO_2$ by mass.

Further, the optical glass consists of 6% -17% of $B_2O_3$, 2-10% of $SiO_2$, more than 25% but less than 45% of $La_2O_3$, 5-25% of $Gd_2O_3$, 0-3% of $Nb_2O_5$, more than 19% but less than 27% of $Ta_2O_5$, 0-16% of ZnO, 0-5% of BaO, 0-5% of CaO, 0-5% of SrO, 3-9% of $ZrO_2$, 0-5% of $Y_2O_3$, 0-8% of $Yb_2O_3$, 0-5% of $WO_3$, 0-2% of $Li_2O$, $Na_2O$ and $K_2O$, equal to 0.01% but less than 0.05% of $Sb_2O_3$ and 0-1% of $SnO_2$ by mass.

Further, the optical glass consists of 10% -16% of $B_2O_3$, 3-6.5% of $SiO_2$, more than 31% but less than 37% of $La_2O_3$, 13-18% of $Gd_2O_3$, 0-1% of $Nb_2O_5$, more than 19% but less than 22% of $Ta_2O_5$, 0-15% of ZnO, 0-2% of BaO, 0-5% of CaO, 0-5% of SrO, 3-9% of $ZrO_2$, 0-5% of $Y_2O_3$, 0-8% of $Yb_2O_3$, 0-5% of $WO_3$, 0-2% of $Li_2O$, $Na_2O$ and $K_2O$, equal to 0.01% but less than 0.05% of $Sb_2O_3$ and 0-1% of $SnO_2$ by mass.

Further, the optical glass consists of 9% -16% of $B_2O_3$, 2-8% of $SiO_2$, more than 30% but less than 42% of $La_2O_3$, 10-22% of $Gd_2O_3$, 0-2% of $Nb_2O_5$, more than 19% but less than 25% of $Ta_2O_5$, 0-15% of ZnO, 0.1-2% of BaO, 0-5% of CaO, 0-5% of SrO, 3-9% of $ZrO_2$, 0-5% of $Y_2O_3$, 0-8% of $Yb_2O_3$, 0-5% of $WO_3$, 0-2% of $Li_2O$, $Na_2O$ and $K_2O$, equal to 0.01% but less than 0.05% of $Sb_2O_3$ and 0-1% of $SnO_2$ by mass.

Further, the optical glass consists of 9% -16% of $B_2O_3$, 2-8% of $SiO_2$, more than 30% but less than 42% of $La_2O_3$, 10-22% of $Gd_2O_3$, 0-2% of $Nb_2O_5$, more than 19% but less than 25% of $Ta_2O_5$, 0-15% of ZnO, 0-2% of BaO, 0-5% of CaO, 0-5% of SrO, 3-9% of $ZrO_2$, 0.2-4% of $Y_2O_3$, 0-8% of $Yb_2O_3$, 0-5% of $WO_3$, 0-2% of $Li_2O$, $Na_2O$ and $K_2O$, equal to 0.01% but less than 0.05% of $Sb_2O_3$ and 0-1% of $SnO_2$ by mass.

Further, the optical glass consists of 10% -16% of $B_2O_3$, 3-6.5% of $SiO_2$, more than 31% but less than 37% of $La_2O_3$, 13-18% of $Gd_2O_3$, 0-1% of $Nb_2O_5$, more than 19% but less than 22% of $Ta_2O_5$, 0-15% of ZnO, 0.1-2% of BaO, 3-9% of $ZrO_2$, 0.2-4% of $Y_2O_3$, 0-5% of $WO_3$ and 0.01-0.05% of $Sb_2O_3$.

The invention has the following benefits: the optical glass does not contain $GeO_2$, is of low cost, has the refractive index (nd) of 1.85-1.90, the Abbe number (vd) of 35-45, the corresponding wavelength below 440 nm when the transmittance thereof reaches 80% and high transmittance, and is available for stable mass production.

DETAILED DESCRIPTION OF THE PREFERRED EMBODIMENTS $B_2O_3$ is a glass network formation body oxide and essential for forming a glass network. Especially, among high refraction and low dispersion optical glasses, $B_2O_3$ is a main component essential for obtaining stabilized glass. When content of $B_2O_3$ is lower than 6%, it is hard to obtain stabilized glass and desirable devitrification resistance. When the content of $B_2O_3$ is higher than 17%, refractive index of the glass does not meet design objective. Therefore, the content of $B_2O_3$ is limited to 6% -17%, more preferably 9-16% and most preferably 10-16%.

$SiO_2$ is also a network formation body oxide for forming glass, and $SiO_2$ in proper amount can improve high-temperature viscosity and the devitrification resistance of the glass. However, the effect is inadequate when the content of $SiO_2$ is lower than 2%. When $SiO_2$ content is higher than 10%, glass fusibility becomes poor, and it is difficult to eliminate air bubbles. Therefore, the content of $SiO_2$ is limited to 2-10%, more preferably 2-8% and most preferably above 3-6.5%.

$La_2O_3$ is a main component of the high refraction and low dispersion optical glass and used for increasing the refractive index of the glass and inconspicuously improving glass dispersion. When $La_2O_3$ is mixed with $B_2O_3$ in the composition system, the devitrification resistance and chemical stability of the glass can be improved. The effect can not be obtained when the content of $La_2O_3$ is lower than 25%. When $La_2O_3$ content exceeds 45%, crystallization property of the glass gets worse. Therefore, the content of $La_2O_3$ is limited to more than 25% but less than 45%, more preferably more than 30% but less than 42%, and most preferably more than 31% but less than 37%.

The function of $Gd_2O_3$ is similar to that of $La_2O_3$, that is, increasing the refractive index of the glass and inconspicuously improving the glass dispersion with regard to optical properties of the glass, and improving chemical stability and the devitrification resistance of the glass with regard to physical and chemical properties thereof Replacement of $La_2O_3$ with a certain amount of $Gd_2O_3$ can improve the devitrification resistance of glass, but the effect is not obvious when the content of $Gd_2O_3$ is below 5%, and the devitrification resistance of glass even gets worse when $Gd_2O_3$ content is above 25%. Therefore, the content of $Gd_2O_3$ is limited to 5-25%, more preferably 10-22% and most preferably 13-18%.

$Nb_2O_5$ is an effective component for improving the refractive index of the glass. In the invention, when the content of $Nb_2O_5$ is more than 5%, $Nb_2O_5$ can dramatically improve the dispersion, reduce the Abbe number and lower short wave transmittance of the glass. Therefore, the content of $Nb_2O_5$ is preferably 0-3%, more preferably 0-2% and most preferably 0-1%.

$Nb_2O_5$ is essential for the optical glass of the invention, and can significantly improve the refractive index and the devitrification resistance of the glass. When the content of $Nb_2O_5$ is more than 27%, specific weight of the glass is excessively high, affecting fusibility and stability of the glass. However, it is hard to get high transmittance when $Nb_2O_5$ content is lower than 19%. Therefore, the content of $Nb_2O_5$ is limited to more than 19% but less than 27%. $Nb_2O_5$ is also expensive, thus the content of $Nb_2O_5$ is more preferably more than 19% but less than 25%, and most preferably more than 19% but less than 22%.

ZnO in proper amount can improve the devitrification resistance and the fusibility and reduce transition temperature of the glass. However, the refractive index of the glass reduces with increase of ZnO. Therefore, the content of ZnO is limited to 0-16% and preferably 0-15%.

BaO is used for reducing the dispersion and improving the fusibility of the glass, and can improve the transmittance of the glass. However, when the content of BaO is more than 5%, the glass is easily recrystallized. Therefore, the content of BaO is limited to 0-5%, more preferably 0-2% and most preferably 0.1-2%.

The function of CaO in the glass is similar to that of BaO. When the content of CaO is more than 5%, it is hard to get high refractive index. Therefore, the content of CaO is limited to 0-5%, and more preferably 0%.

The function of SrO in the glass is similar to that of BaO and CaO. Replacement of part of BaO with SrO can quicken melting and clarification and lower recrystallization tendency of the glass. However, when the content of SrO is more than 5%, melting is difficult. Therefore, the content of SrO is limited to 0-5% and more preferably 0%.

$ZrO_2$ can improve the devitrification resistance, chemical stability and refractive index of the glass, and reduce dispersion. However, when the content of $ZrO_2$ is more than 9%, the devitrification resistance of the glass gets worse. Therefore, the content of $ZrO_2$ is limited to 0-9% and more preferably 3-9%.

$Y_2O_3$ can improve stability of the glass and also can be used as a component for adjusting optical constants of the glass. However, when the content of $Y_2O_3$ exceeds 8%, the devitrification resistance of glass gets worse. Therefore, the content of $Y_2O_3$ is preferably 0-8%, more preferably more than 0% but less than 5%, and most preferably 0.2-4%.

The function of $Yb_2O_3$ in the glass is the same as that of $Y_2O_3$. When the content of $Yb_2O_3$ is more than 8%, devitrification easily occurs. Therefore, the content of $Yb_2O_3$ is preferably 0-8% and more preferably 0%.

$WO_3$ is mainly used for maintaining the optical constants and improving recrystallization of the glass. However, excessive content of $WO_3$ can result in transmittance decrease and staining degree increase of the glass, and poor crystallization property. Therefore, the content of $WO_3$ is preferably 0-5%.

$Li_2O$, $Na_2O$ and $K_2O$ are mainly used for reducing transition temperature of the glass. Low transition temperature of the glass is beneficial to reducing extrusion and annealing cost of glass elements. However, $Li_2O$, $Na_2O$ and $K_2O$ can result in devitrification resistance decrease and significant refractive index decrease of the glass. Therefore, the total content of $Li_2O$, $Na_2O$ and $K_2O$ is limited to 0-2% and preferably 0%.

$Sb_2O_3$ can be added as a clarifier. However, high content of $Sb_2O_3$ can result in increased staining degree and reduced transmittance of glass as well as a great number of platinum particles in glass made from platinum dish. To this end and in order to meet new environmental protection requirements, the content of $Sb_2O_3$ is limited to be not more than 0.1%. In the invention, trace amount of $Sb_2O_3$ in the optical glass can effectively reduce clarification temperature and improve transmittance of the glass. Therefore, the content of $Sb_2O_3$ is preferably equal to 0.01% but less than 0.1%, and more preferably 0.01-0.05%.

$SnO_2$ is also used as a clarifier, but its clarification effect for glass is not as good as that of $Sb_2O_3$. A great amount of $SnO_2$ can result in glass staining. Therefore, the content of $SnO_2$ is limited to 0-1% and preferably 0%.

Tables 1 to 4 show examples 1 to 15 and comparison examples 1 to 4 of the optical glass of the invention, and refractive index (nd), Abbe number (vd) and staining degree ($\lambda_{80}/\lambda_5$) of the glass.

TABLE 1

| | Examples (mass %) | | | | |
|---|---|---|---|---|---|
| | 1 | 2 | 3 | 4 | 5 |
| $B_2O_3$ | 12.9 | 12.8 | 12.6 | 13.9 | 16.0 |
| $SiO_2$ | 5.05 | 5.5 | 4.95 | 5.0 | 4.8 |
| $La_2O_3$ | 34.8 | 36.89 | 35.9 | 30.0 | 35.0 |
| $Gd_2O_3$ | 17.4 | 15.5 | 16.485 | 9.2 | 9.8 |
| $Ta_2O_5$ | 19.2 | 19.4 | 19.15 | 19.1 | 19.05 |
| $Y_2O_3$ | 2.0 | 2.0 | 1.15 | 0.5 | |
| $Yb_2O_3$ | 0.5 | 1.0 | | | |
| $Nb_2O_5$ | 1.0 | 0.5 | 0.3 | | 1.5 |

TABLE 1-continued

| | Examples (mass %) | | | | |
|---|---|---|---|---|---|
| | 1 | 2 | 3 | 4 | 5 |
| WO$_3$ | | 0.2 | 0.8 | 4.0 | 1.4 |
| ZrO$_2$ | 6.2 | 5.3 | 7.65 | 3.8 | 6.0 |
| BaO | 0.9 | | 1.0 | | |
| ZnO | | 0.9 | | 14.2 | 5.4 |
| Li$_2$O | | | | 0.28 | 1.0 |
| Na$_2$O | | | | | |
| K$_2$O | | | | | |
| CaO | | | | | |
| SrO | | | | | |
| Sb$_2$O$_3$ | 0.05 | 0.01 | 0.015 | 0.02 | 0.05 |
| SnO$_2$ | | | | | |
| Total | 100 | 100 | 100 | 100 | 100 |
| nd | 1.88320 | 1.88185 | 1.88500 | 1.85400 | 1.85414 |
| vd | 40.8 | 40.9 | 40.88 | 40.5 | 40.3 |
| $\lambda_{80}/\lambda_5$ (nm) | 431/321 | 425/315 | 424/325 | 415/340 | 410/324 |

TABLE 2

| | Examples (mass %) | | | | |
|---|---|---|---|---|---|
| | 6 | 7 | 8 | 9 | 10 |
| B$_2$O$_3$ | 10.43 | 11.6 | 13.4 | 11.2 | 13.5 |
| SiO$_2$ | 6.5 | 5.4 | 8.0 | 7.2 | 5.05 |
| La$_2$O$_3$ | 36.5 | 42.47 | 38.91 | 39.5 | 37.0 |
| Gd$_2$O$_3$ | 17.8 | 10.0 | 5 | 15.6 | 14.5 |
| Ta$_2$O$_5$ | 20.3 | 21.2 | 19.6 | 19.01 | 22.0 |
| Y$_2$O$_3$ | | | 1.0 | | |
| Yb$_2$O$_3$ | | 0.5 | | | |
| Nb$_2$O$_5$ | | | 1.0 | 0.8 | |
| WO$_3$ | 1.0 | | 2.5 | | |
| ZrO$_2$ | 6.0 | 5.8 | 5.0 | 6.1 | 6.7 |
| BaO | 0.4 | | 4.5 | | |
| ZnO | | 3.0 | | | 1.2 |
| Li$_2$O | 1.0 | | 0.5 | 0.5 | |
| Na$_2$O | | | | | |
| K$_2$O | | | | | |
| CaO | | | 0.5 | | |
| SrO | | | | | |
| Sb$_2$O$_3$ | 0.07 | 0.03 | 0.09 | 0.09 | 0.05 |
| SnO$_2$ | | | | | |
| Total | 100 | 100 | 100 | 100 | 100 |
| nd | 1.8810 | 1.8798 | 1.8506 | 1.8738 | 1.8788 |
| vd | 40.5 | 40.2 | 39.9 | 41.2 | 40.5 |
| $\lambda_{80}/\lambda_5$ (nm) | 433/324 | 424/314 | 410/321 | 425/318 | 419/314 |

TABLE 3

| | Examples (mass %) | | | | |
|---|---|---|---|---|---|
| | 11 | 12 | 13 | 14 | 15 |
| B$_2$O$_3$ | 9.96 | 16.0 | 17.0 | 16.5 | 14.5 |
| SiO$_2$ | 8.45 | 3.0 | 2.0 | 3.5 | 6.3 |
| La$_2$O$_3$ | 39.0 | 40 | 36.5 | 35.0 | 35.0 |
| Gd$_2$O$_3$ | 15.0 | 5.0 | 13.5 | 8.0 | 9.0 |
| Ta$_2$O$_5$ | 19.2 | 26.0 | 24.0 | 19.8 | 19.5 |
| Y$_2$O$_3$ | | | | 5.0 | |
| Yb$_2$O$_3$ | | | | 1.0 | |
| Nb$_2$O$_5$ | 0.7 | 1.0 | | | 2.0 |
| WO$_3$ | | 2 | 1.95 | | 1.0 |
| ZrO$_2$ | 5.9 | 5.15 | 5.0 | 9.0 | 5.6 |
| BaO | | | | 1.85 | |
| ZnO | 0.5 | 1.8 | | | 5.8 |
| Li$_2$O | 1.0 | | | | 1.0 |
| Na$_2$O | | | | | 0.22 |
| K$_2$O | | | | | |
| CaO | | | | | |
| SrO | | | | 0.3 | |
| Sb$_2$O$_3$ | 0.09 | 0.05 | 0.05 | 0.05 | 0.08 |
| SnO$_2$ | 0.2 | | | | |
| Total | 100 | 100 | 100 | 100 | 100 |
| nd | 1.8696 | 1.8745 | 1.8805 | 1.8650 | 1.8512 |
| vd | 41.0 | 38.8 | 39.8 | 42.4 | 40.2 |
| $\lambda_{80}/\lambda_5$ (nm) | 435/318 | 437/326 | 435/325 | 419/312 | 410/325 |

TABLE 4

| | Comparison examples (mass %) | | | |
|---|---|---|---|---|
| | 1 | 2 | 3 | 4 |
| B$_2$O$_3$ | 13.52 | 12.87 | 10.8 | 13.97 |
| SiO$_2$ | 6.85 | | 6.7 | 4.4 |
| La$_2$O$_3$ | 37.74 | 25.05 | 41.2 | 40.03 |
| Gd$_2$O$_3$ | | 10.26 | 10.0 | 15.8 |
| Ta$_2$O$_5$ | | 13.23 | 15.9 | 18.7 |
| Y$_2$O$_3$ | | | 6.0 | |
| GeO$_2$ | | 13.22 | | |
| Nb$_2$O$_5$ | 5.53 | | 0.8 | 1.0 |
| Bi$_2$O$_3$ | | 15.23 | | |
| TiO$_2$ | 12.98 | | | |
| ZrO$_2$ | 5.87 | 4.41 | 5.2 | 6.0 |
| BaO | 12.15 | | | |
| ZnO | 2.79 | 4.41 | 3.2 | |
| Li$_2$O | | 1.32 | | |
| CaO | 2.57 | | | |
| SrO | | | | |
| Sb$_2$O$_3$ | | | 0.2 | 0.1 |
| SnO$_2$ | | | | |
| Total | 100 | 100 | 100 | 100 |
| nd | 1.89983 | 1.88974 | 1.88 | 1.8817 |
| vd | 31.46 | 33.87 | 41.2 | 40.9 |
| $\lambda_{80}$ (nm) | 489 | | 443 | >440 |

The optical glass of the examples of the invention shown in Tables 1 to 3 was obtained by the following method: common raw materials of optical glass, including oxides, hydroxides, carbonates, nitrates, etc. were weighed to meet proportions of the examples shown in Tables 1 to 3; mixed, transferred to a platinum crucible and fused at 1200°-1450° for 4-7 h; and melted, clarified and stirred for homogenization, and then injected into a die for slow cooling.

Refractive index (nd) and Abbe number (vd) in Tables 1 to 4 are data determined after slowly cooling optical glass samples at −25°/h.

The glass was made into 10 mm±0.1 mm thick samples to measure the corresponding wavelength $\lambda_{80}$ when the transmittance of the glass reached 80% and the corresponding wavelength $\lambda_5$ when the transmittance of the glass reached 5%.

As shown in Tables 1 to 3, the optical glass of examples 1 to 15 of the invention has the optical constants (the refractive index and the Abbe number) required by the invention. The corresponding wavelength was below 440 nm when the transmittance of the 10 mm thick optical glass reached 80%. Therefore, the optical glass of the invention has high transmittance.

In conclusion, the optical glass of the invention consists of a $B_2O_3$—$SiO_2$—$La_2O_3$—$Gd_2O_3$—$Ta_2O_5$ system, does not contain $GeO_2$, has the optical constants as the refractive index of 1.85-1.90 and the Abbe number of 35-45, the corresponding wavelength below 440 nm when the transmittance thereof reaches 80%, high transmittance and lower production cost, and also meets the latest environmental protection requirements.

What is claimed is:

1. A high refraction and low dispersion optical glass comprising 6%-17% of $B_2O_3$, 2-10% of $SiO_2$, more than 25% but less than 45% of $La_2O_3$, 5-25% of $Gd_2O_3$, 0-3% of $Nb_2O_5$, more than 19% but less than 27% of $Ta_2O_5$, 0-16% of ZnO, 0-5% of BaO, 0-5% of CaO, 0-5% of SrO, 0-9% of $ZrO_2$, 0-8% of $Y_2O_3$, 0-8% of $Yb_2O_3$, 0-5% of $WO_3$, 0-2% of $Li_2O$, $Na_2O$ and $K_2O$, from 0.01% to less than 0.1% of $Sb_2O_3$ and 0-1% of $SnO_2$ by mass, wherein said high refraction and low dispersion optical glass is free of $GeO_2$.

2. The high refraction and low dispersion optical glass according to claim 1, comprising 6%-17% of $B_2O_3$, 2-10% of $SiO_2$, more than 25% but less than 45% of $La_2O_3$, 5-25% of $Gd_2O_3$, 0-3% of $Nb_2O_5$, more than 19% but less than 27% of $Ta_2O_5$, 0-16% of ZnO, 0-5% of BaO, 0-5% of CaO, 0-5% of SrO, 3-9% of $ZrO_2$, 0-8% of $Y_2O_3$, 0-8% of $Yb_2O_3$, 0-5% of $WO_3$, 0-2% of $Li_2O$, $Na_2O$ and $K_2O$, from 0.01% to less than 0.1% of $Sb_2O_3$ and 0-1% of $SnO_2$ by mass.

3. The high refraction and low dispersion optical glass according to claim 1, comprising 9%-16% of $B_2O_3$, 2-8% of $SiO_2$, more than 30% but less than 42% of $La_2O_3$, 10-22% of $Gd_2O_3$, 0-2% of $Nb_2O_5$, more than 19% but less than 25% of $Ta_2O_5$, 0-15% of ZnO, 0-2% of BaO, 0-5% of CaO, 0-5% of SrO, 3-9% of $ZrO_2$, 0-5% of $Y_2O_3$, 0-8% of $Yb_2O_3$, 0-5% of $WO_3$, 0-2% of $Li_2O$, $Na_2O$ and $K_2O$, from 0.01% to less than 0.05% of $Sb_2O_3$ and 0-1% of $SnO_2$ by mass.

4. The high refraction and low dispersion optical glass according to claim 1, comprising 10%-16% of $B_2O_3$, 3-6.5% of $SiO_2$, more than 31% but less than 37% of $La_2O_3$, 13-18% of $Gd_2O_3$, 0-1% of $Nb_2O_5$, more than 19% but less than 22% of $Ta_2O_5$, 0-15% of ZnO, 0-2% of BaO, 0-5% of CaO, 0-5% of SrO, 3-9% of $ZrO_2$, 0-5% of $Y_2O_3$, 0-8% of $Yb_2O_3$, 0-5% of $WO_3$, 0-2% of $Li_2O$, $Na_2O$ and $K_2O$, from 0.01% to less than 0.05% of $Sb_2O_3$ and 0-1% of $SnO_2$ by mass.

5. The high refraction and low dispersion optical glass according to claim 1, comprising 9%-16% of $B_2O_3$, 2-8% of $SiO_2$, more than 30% but less than 42% of $La_2O_3$, 10-22% of $Gd_2O_3$, 0-2% of $Nb_2O_5$, more than 19% but less than 25% of $Ta_2O_5$, 0-15% of ZnO, 0.1-2% of BaO, 0-5% of CaO, 0-5% of SrO, 3-9% of $ZrO_2$, 0-5% of $Y_2O_3$, 0-8% of $Yb_2O_3$, 0-5% of $WO_3$, 0-2% of $Li_2O$, $Na_2O$ and $K_2O$, from 0.01% to less than 0.05% of $Sb_2O_3$ and 0-1% of $SnO_2$ by mass.

6. The high refraction and low dispersion optical glass according to claim 1, comprising 9%-16% of $B_2O_3$, 2-8% of $SiO_2$, more than 30% but less than 42% of $La_2O_3$, 10-22% of $Gd_2O_3$, 0-2% of $Nb_2O_5$, more than 19% but less than 25% of $Ta_2O_5$, 0-15% of ZnO, 0-2% of BaO, 0-5% of CaO, 0-5% of SrO, 3-9% of $ZrO_2$, 0.2-4% of $Y_2O_3$, 0-8% of $Yb_2O_3$, 0-5% of $WO_3$, 0-2% of $Li_2O$, $Na_2O$ and $K_2O$, from 0.01% to less than 0.05% of $Sb_2O_3$ and 0-1% of $SnO_2$ by mass.

7. The high refraction and low dispersion optical glass according to claim 1, comprising 10%-16% of $B_2O_3$, 3-6.5% of $SiO_2$, more than 31% but less than 37% of $La_2O_3$, 13-18% of $Gd_2O_3$, 0-1% of $Nb_2O_5$, more than 19% but less than 22% of $Ta_2O_5$, 0-15% of ZnO, 0.1-2% of BaO, 3-9% of $ZrO_2$, 0.2-4% of $Y_2O_3$, 0-5% of $WO_3$ and 0.01-0.05% of $Sb_2O_3$ by mass.

8. The high refraction and low dispersion optical glass according to claim 1, wherein the optical glass has a refractive index of 1.85-1.90 and an Abbe number of 35-45.

9. The high refraction and low dispersion optical glass according to claim 1, wherein a corresponding wavelength is below 440 nm when a transmittance of the optical glass reaches 80%.

10. The high refraction and low dispersion optical glass according to claim 2, wherein the optical glass has a refractive index of 1.85-1.90 and an Abbe number of 35-45.

11. The high refraction and low dispersion optical glass according to claim 3, wherein the optical glass has a refractive index of 1.85-1.90 and an Abbe number of 35-45.

12. The high refraction and low dispersion optical glass according to claim 4, wherein the optical glass has a refractive index of 1.85-1.90 and an Abbe number of 35-45.

13. The high refraction and low dispersion optical glass according to claim 5, wherein the optical glass has a refractive index of 1.85-1.90 and an Abbe number of 35-45.

14. The high refraction and low dispersion optical glass according to claim 6, wherein the optical glass has a refractive index of 1.85-1.90 and an Abbe number of 35-45.

15. The high refraction and low dispersion optical glass according to claim 7, wherein the optical glass has a refractive index of 1.85-1.90 and an Abbe number of 35-45.

16. The high refraction and low dispersion optical glass according to claim 2, wherein a corresponding wavelength is below 440 nm when a transmittance of the optical glass reaches 80%.

17. The high refraction and low dispersion optical glass according to claim 3, wherein a corresponding wavelength is below 440 nm when a transmittance of the optical glass reaches 80%.

18. The high refraction and low dispersion optical glass according to claim 4, wherein a corresponding wavelength is below 440 nm when a transmittance of the optical glass reaches 80%.

19. The high refraction and low dispersion optical glass according to claim 5, wherein a corresponding wavelength is below 440 nm when a transmittance of the optical glass reaches 80%.

20. The high refraction and low dispersion optical glass according to claim 6, wherein a corresponding wavelength is below 440 nm when a transmittance of the optical glass reaches 80%.

21. The high refraction and low dispersion optical glass according to claim 7, wherein a corresponding wavelength is below 440 nm when a transmittance of the optical glass reaches 80%.

* * * * *